United States Patent Office 3,213,617
Patented Oct. 26, 1965

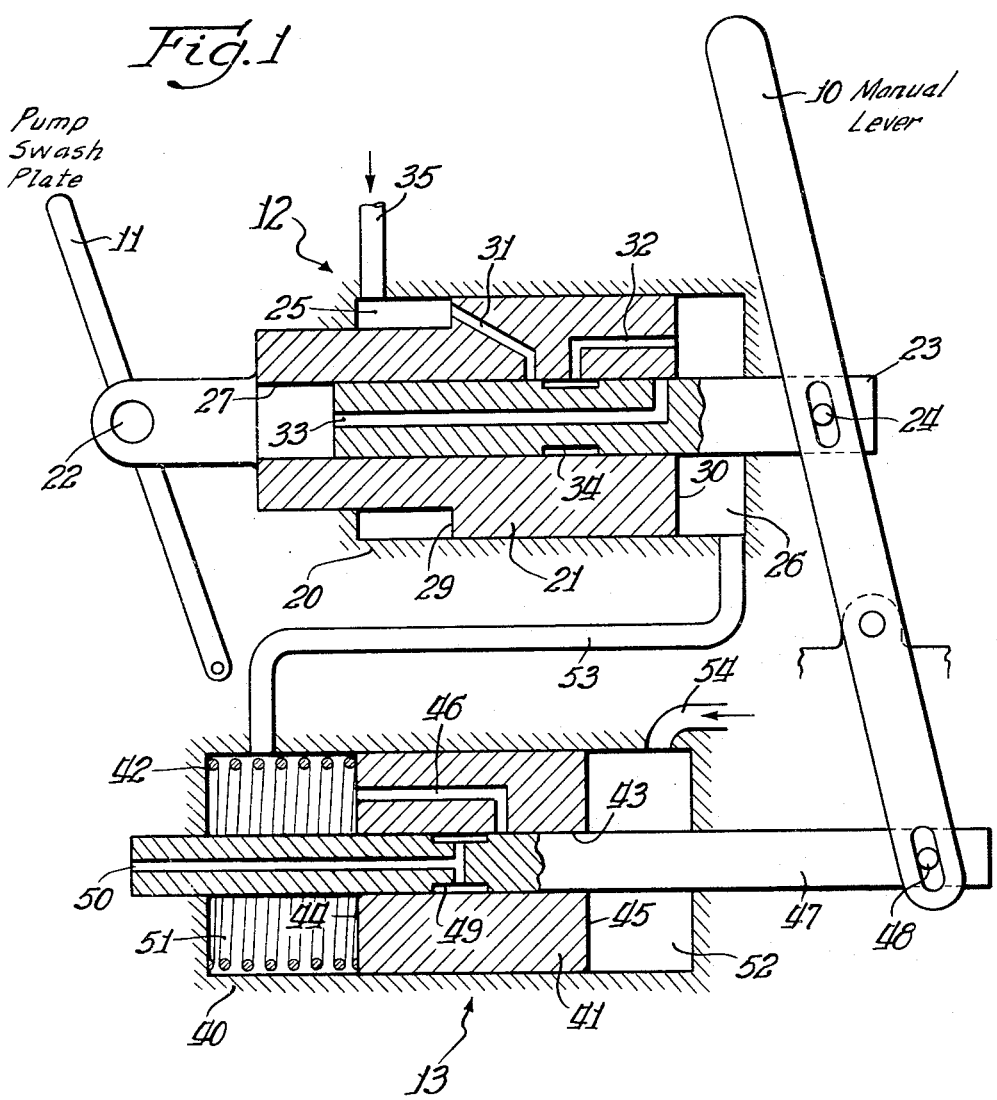

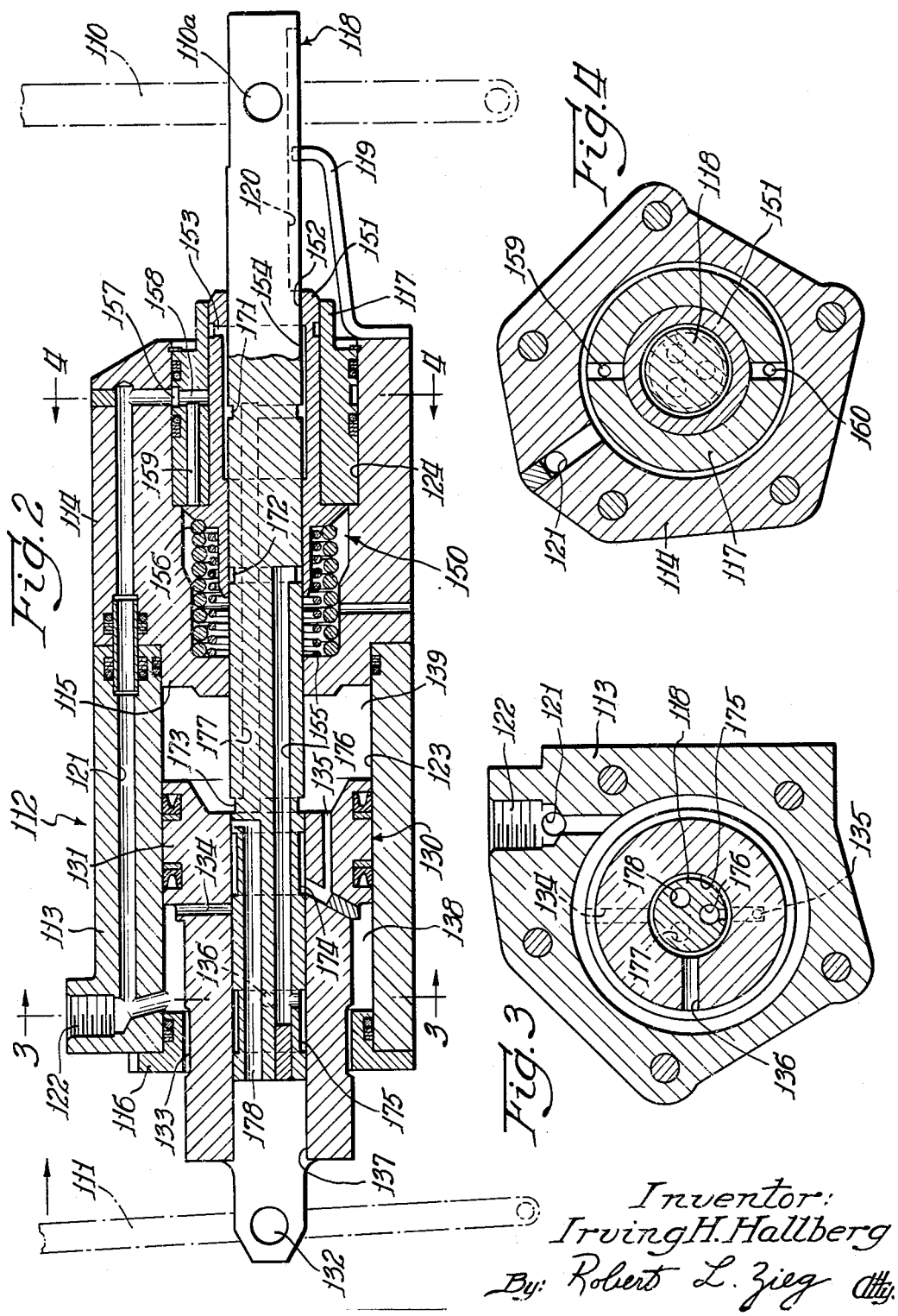

3,213,617
HYDROSTATIC TRANSMISSION
ANTI-STALL VALVE
Irving H. Hallberg, Des Plaines, Ill., assignor to Borg-Warner Corporation, Chicago, Ill., a corporation of Illinois
Filed Feb. 24, 1964, Ser. No. 346,759
6 Claims. (Cl. 60—53)

This invention relates to a servo mechanism for control of a hydrostatic transmission.

More particularly this invention relates to a servo mechanism to control the swash plate angle for the variable displacement fluid pump in a hydrostatic transmission. The swash plate angle is controlled by a manual lever, and a servo valve is provided to move the swash plate.

The object of this invention is to provide an anti-stall valve working in conjunction with a servo valve for controlling a hydrostatic transmission driven by a prime mover wherein the anti-stall valve is responsive to the swash plate angle of the pump and to the fluid pressure in the system and is operative to prevent stalling of the prime mover due to overload by increasing the mechanical advantage through the transmission by adjustment of the swash plate angle.

The invention consists of the novel construction, arrangements and devices to be hereinafter described and claimed for carrying out the above-stated objects and such other objects as will be apparent from the following description of preferred forms of the invention, illustrated with reference to the accompanying drawings, in which:

FIG. 1 is a cross-sectional view of the servo valve and anti-stall valve for one embodiment of the present invention;

FIG. 2 is a cross-sectional view through an integral servo valve and anti-stall valve constituting a second embodiment of the present invention;

FIG. 3 is a sectional view taken along the line 3—3 of FIG. 2; and

FIG. 4 is a sectional view taken along the line 4—4 or FIG. 2.

Referring to FIG. 1, one embodiment of the invention is illustrated wherein the anti-stall valve and the servo valve are separate structures. The present invention is designed to control a hydrostatic transmisison adapted to be driven by a prime mover and utilizing a fluid pump and a fluid motor to provide an infinitely variable drive ratio, such as that shown in copending application S/N 259,499 filed February 19, 1963, of common assignee and now U.S. Patent No. 3,143,858, issued August 11, 1964.

As illustrated in FIG. 1, a manual lever 10 is provided to adjust the angle of a pump swash plate 11 which is schematically represented. A servo valve 12 is provided to transmit the movement of the manual lever 10 to the swash plate 11. A fluid pressure responsive anti-stall valve 13 is hydraulically connected to the servo valve 12 and mechanically connected to the manual lever 10.

The servo valve 12 comprises a casing 20 having a piston 21 slidable therein. The piston is connected to the swash plate 11 at 22. A pilot valve 23 is connected to the manual lever 10 at 24 and is slidable within the piston 21.

The piston 21 and casing 20 define pressure chambers 25 and 26 at opposite ends of the servo valve 12. The piston 21 is provided with a longitudinal bore 27 receiving the pilot valve 23.

The piston 21 has an annular face 29 and an annular face 30. A fluid pressure passage 31 connects chamber 25 with chamber 26 by means of a groove 34 in the pilot valve 23 and a passage 32 in the piston. The pilot valve 23 is also provided with an exhaust passage 33.

A conduit 35 connects the pressure chamber 25 of the servo valve 12 to the low pressure of the charge pump (not shown) of the hydrostatic transmission.

The anti-stall valve 13 includes a casing 40 with a piston 41 slidable therein. A spring 42 is mounted within the casing and urges the piston 41 to the right as illustrated in FIG. 1.

The piston 41 has a longitudinal bore 43 extending therethrough and annular faces 44 and 45. A fluid passage 46 connects the annular face 44 with the bore 43. A pilot valve 47 is provided which is slidable within the bore 43 and is connected to the manual lever as indicated at 48. The pilot valve 47 has a groove 49 connected to an exhaust passage 50 in the pilot valve.

The piston 41 and casing 40 define pressure chambers 51 and 52 at opposite ends of the anti-stall valve 13. The chamber 51 of the anti-stall valve is connected by conduit 53 to the chamber 26 of the servo valve 12. The chamber 52 is connected to the high pressure output of the fluid pump of the transmission by a conduit 54.

The operation of the servo valve and the anti-stall valve is as follows: the manual lever 10 is moved counter-clockwise when it is desired to increase the angular displacement of the fluid pump of the transmission by moving the swash plate 11. When the manual lever 10 is moved counter-clockwise, the pilot valve 23 will be moved to the left and fluid pressure in the chamber 25 will be communicated through fluid passage 31, annular groove 34 and fluid passage 32 to the chamber 26. Fluid pressure in the chamber 26 will act on the annular surface 30 of the piston 21 and move the piston to the left, moving the swash plate and increasing the fluid displacement of the transmission pump. The piston 21 will continue to move to the left until annular groove 34 is no longer in communication with the fluid pressure passage 31, as in the position illustrated in FIG. 1. Fluid pressure is no longer communicated to the chamber 26, and any fluid pressure existing therein will be exhausted through passage 33 until the sum of the force developed on the annular surface 30 of the piston 21 by the fluid pressure in the chamber 26, the force developed on the annular surface 29 of the piston due to fluid pressure in the chamber 25, and the force required to hold the swash plate 11 equal zero. Thus, the piston 21 of the servo valve will respond to movement of the manual lever 10 to move the swash plate 11 in direct proportion to the amount of movement of the manual lever 10.

When it is desired to decrease the angle of the swash plate 11, the manual lever 10 is moved clockwise, moving the pilot valve 23 to the right, as illustrated in FIG. 1. When the pilot valve is moved to the right, chamber 26 is connected to exhaust passage 33 and the pressure in the chamber 26 will decrease, producing an unbalanced condition wherein the piston 21 will move to the right due to fluid pressure in the chamber 25, thereby decreasing the angle of the swash plate 11. The piston 21 will continue to move to the right until the exhaust passage 33 is no longer in communication with the chamber 26. Thus, when moving the manual lever 10 clockwise, the piston 21 of the servo valve will move the swash plate 11 to a decreased angle in direct proportion to movement of the lever 10.

The novel anti-stall valve of the present invention is connected to the manual lever 10 and will prevent stalling of the engine of the vehicle by increasing the mechanical advantage of the transmission by decreasing the swash plate angle and thereby decreasing the displacement when an engine overload condition exists.

The piston 41 of the anti-stall valve will be in a position within the valve casing 13 determined by the size of the spring 42 and the amount of pressure in the chamber 52. The pressure in chamber 52 is the high pressure fluid of the hydrostatic transmission and will vary in direct proportion to the output torque of the transmission.

The pilot valve 47 will be in a position determined by the position of the manual lever 10 and thus varies with the selected angle of the swash plate.

When an engine overload condition exists for a particular setting of the swash plate angle which will create an increased torque input to the transmission and thus an increase in the transmission pump output pressure, the high pressure fluid in the chamber 52 will act on the annular surface 45 and the piston 41 will overcome the force of the spring 42 and move the piston 41 to the left until the fluid pressure passage 46 in the piston 41 communicates with the groove 49 in the pilot valve 47.

When the fluid pressure passage 46 is in communication with the groove 49, fluid pressure within the chamber 26 of the servo valve 12 will be exhausted through annular groove 49 and exhaust passage 50. As previously explained, when the pressure chamber 26 of the servo valve 12 is connected to exhaust, the piston 21 of the servo valve 12 will move to the right, decreasing the displacement of the swash plate 11 and thereby increase the mechanical advantage available through the transmission.

As the mechanical advantage through the transmission increases, the engine input torque to the transmission and thereby the transmission pump output pressure will decrease and thereby decrease the pressure within the chamber 52 of the anti-stall valve 13. When the pressure in the chamber 52 of the anti-stall valve 13 decreases, the spring 42 will move the piston 41 of the anti-stall valve to the right until the fluid pressure passage 46 is out of communication with the annular groove 49 in the pilot valve 47, thus interrupting the connection between the fluid pressure chamber 26 of the servo valve 12 and exhaust and thereby stopping further movement of the swash plate 11.

It will be apparent that, as the angle of the swash plate 11 is increased increasing the displacement of the fluid pump, the anti-stall valve will become increasingly responsive since the groove 49 in pilot valve 47 is moving closer to passage 46 in piston 41. Thus, as the torque ratio through the transmission or the mechanical advantage diminishes, the anti-stall valve will decrease the swash plate angle at a lesser value of output torque from the transmission.

The anti-stall valve thus responds to two input signals: (1) the position of the manual lever reflecting the mechanical advantage or torque ratio available through the transmission, and (2) the fluid pressure developed within the transmission reflecting the load on the transmission or torque output of the transmission. The novel anti-stall valve will then maintain a constant input torque to the transmission and prevent engine stall by sensing the output torque from the transmission and the torque ratio available through the transmission.

The input torque to the transmission is represented by the $$\text{Formula } T_i = \frac{qp}{24\pi}$$

where $q$=displacement per revolution of the pump (determined by position of pilot valve 47) and $p$=system pressure. Therefore, as the pilot valve moves to give larger pump displacements (or as the transmission mechanical advantage is diminished), the pressure which can be tolerated so as to maintain the constant input torque is less. The disclosed device, then, is a means of maintaining a constant input torque while the displacement of the transmission pump and the pressure developed vary.

Referring to FIG. 2, a second embodiment of the invention is illustrated wherein the anti-stall valve and the servo valve are incorporated in an integral valve unit 112. A manual lever 110 is provided to change the angle of a swash plate 111, each schematically illustrated. The valve unit 112 includes a casing 113 and a casing 114 jointed together in any known manner to provide a two-section valve casing. The casing 114 has a wall 115 which divides the interior of the casing into two parts. An end plate 116 is secured in the open end of the casing 113 and an end plug 117 is secured in the open end of the casing 114.

The manual lever 110 is pinned at 110a to a pilot valve 118 and is operable to slide the pilot valve back and forth in the casings 113 and 114.

The casings 113 and 114 have a fluid passage 121 extending therethrough which is adapted to be connected at a port 122 to the high pressure fluid from the pump of the hydrostatic transmission. The casing 113 has a bore 123 therein and the casing 114 has a stepped bore 124 therein in which is mounted the end plug 117.

The servo valve 130 is mounted within the bore 123 of the casing 113 and the anti-stall valve 150 is mounted within the bore 124 in the casing 114.

The servo valve 130 includes a piston 131 slidable in the bore 123 in the casing 113. The piston 131 is connected to the swash plate 111 at 132. The piston 131 has a circumferential groove 133 thereon and fluid passages 134, 135 and 136 formed therein. The piston 131 also has a longitudinal bore 137 extending therethrough receiving the pilot valve 118. The engagement of the piston 131 in the cylindrical bore 123 forms pressure chambers 138 and 139 in the casing 113.

The fluid passage 134 provides communication between the pressure chamber 138 and the cylindrical bore 137 of the piston 131. The fluid passage 135 provides fluid communication between the fluid pressure chamber 139 and the cylindrical bore 137 in the piston 131.

The anti-stall valve 150 includes a sleeve 151 having a longitudinal bore 152 extending therethrough in which the pilot valve 118 is slidably received. The sleeve 151 has a fluid passage 153 therein which communicates with a circumferential groove 154 formed in the bore 152. Springs 155 and 156 are mounted in engagement with the end wall 115 and the sleeve 151. Springs 155 and 156 urge the sleeve to the right, as viewed in FIG. 2, and into engagement with the end plug 117. The end plug 117 is provided with a circumferential groove 157 which communicates with two fluid passages 158 formed in the end plug 117. Slidably mounted within the end plug 117 are pistons 159 and 160 which are 180° displaced from one another around the central axis of the pilot valve 118. The pistons 159 and 160 engage the sleeve 151, and when fluid pressure exists in passages 158, the pistons 159 and 160 will urge the sleeve to the left against the force of the springs 155 and 156, as viewed in FIG. 2.

The pilot valve 118 has circumferential grooves 170, 171, 172, 173 and 174 formed therein. A passage 176 formed in the pilot valve 118 provides fluid communication between groove 175 and groove 172. The fluid passage 177 in the pilot valve 118 provides fluid communication between the groove 173 and the groove 171. An exhaust passage 178 is also formed in the pilot valve 118.

The operation of the integral servo valve and anti-stall valve unit 112 is quite similar to the embodiment of FIG. 1 explained above. The servo piston 131 controls angular displacement of the pump swash plate 111, as determined by the position of the manual lever 110. Fluid pressure from the high pressure outlet of the fluid pump of the transmission enters passage 121 through port 122 and flows into chamber 138. Fluid pressure in the chamber 138 urges the piston 131 to the right, which is the direction of increasing pump displacement for this embodiment as indicated by the arrow in FIG. 2 with reference to pump swash plate 111.

Assuming the manual lever is in a neutral position, such as illustrated in FIG. 2, the groove 133 will return fluid pressure in the pressure chamber 138 to the sump and insure that no fluid pressure is communicated to the motor to eliminate the possibility of a creep condition. When it is desired to increase the pump displacement and thereby change the transmission ratio, the manual lever is moved clockwise, moving the pilot valve 118 to the right.

When the pilot valve 118 is moved to the right, the exhaust passage 178 will be in communication with the fluid chamber 139 and exhaust any pressure existing therein to the sump. Therefore, fluid pressure in chamber 138 can now move the piston 131 to the right. The piston 131 will move to the right until the passage 134 communicates with the groove 174 in the pilot valve 118. Fluid pressure in the groove 174 will be transmitted through the passage 135 and into the fluid chamber 139. The piston 131 will therefore move to the right until the pressure transmitted through groove 174 and passage 135 builds up in the chamber 139 to a sufficient amount to resist further movement of the piston. Thus, an equalization of force will take place to determine the position of the piston 131.

The servo valve 130 is designed so that movement of the piston 131 will be the same as the movement of the pilot valve 118.

When it is desired to decrease the pump displacement or move through neutral in a direction to get reverse pump operation, the manual lever is moved counterclockwise, which will bring the groove 174 again into communication with passage 134 and allow fluid pressure to be communicated to fluid pressure chamber 139, and thereby move the piston 131 to the left to decrease pump displacement. The pressure on opposite sides of the piston 131 is designed so that, when fluid pressure is communicated into passage 135, the force acting on the piston 131, due to pressure in chamber 139, can overcome the force acting on the opposite side of the piston due to the pressure in chamber 138. Thus, the piston 131 will follow exactly the movement of the pilot valve 118 to the left when it is desired to decrease pump displacement or obtain reverse operation.

In operation the anti-stall valve 150 will prevent engine overload, as does the stall valve 13 of FIG. 1, by decreasing pump displacement and thereby increasing the transmission drive ratio when the engine is overloaded. Fluid pressure from the output side of the pump of the hydrostatic transmission will be communicated through passage 121 and groove 157 into passages 158 and the end plug 117. Fluid pressure in the passages 158 will act on the pistons 159 and 160 to move the pistons and thereby the sleeve 151 against the force of the springs 155 and 156, moving the sleeve 151 to the left, as viewed in FIG. 2.

When the pressure in passage 121 reaches a predetermined value dependent upon the position of the pilot valve 118, the groove 154 in the sleeve 151 will come into communication with the groove 172 in the pilot valve. When this communication is established, fluid pressure can then flow from chamber 138 into passage 176, groove 172, groove 154, passage 177, and into fluid pressure chamber 139. Fluid pressure in the chamber 139, as previously explained, will move the piston 131 to the left to decrease pump displacement. The piston will move to the left until the transmission ratio is increased to an extent which will reduce the fluid pressure in the passage 121 from the outlet side of the hydrostatic transmission pump.

When the pressure decreases in the passage 121, the springs 155 and 156 will move the sleeve 151 to the right a given amount and interrupt communication between the grooves 172 and 154, thereby interrupting the flow of fluid pressure into the fluid pressure chamber 139. In this manner, the anti-stall valve will increase the transmission drive ratio by decreasing the pump displacement to reduce the engine overload and modulate to hold this position until the overload is removed.

The anti-stall valve 150 compares two input signals, as was the case in the embodiment of FIG. 1, one being the position of the pilot valve 118 reflecting the manual setting of the lever 110 and thereby the transmission drive ratio, and the second being the torque output of the transmission, and adjusts the swash plate accordingly to prevent an engine overload.

The anti-stall valve 150 is also designed to prevent a build-up of pressure beyond a predetermined maximum. If a predetermined maximum pressure is exceeded, the sleeve 151 will be moved to the left to an extent that passage 153 will be in communication with the passages 158 in the end plug 117, and thereby fluid pressure will be communicated through passage 177 and directly into the fluid pressure chamber 139 and the pump displacement will thereby be decreased to relieve the excess pressure condition.

The anti-stall valve 150 advantageously utilizes pistons 159 and 160 of a small area, thereby requiring smaller springs than would otherwise be required to balance a given fluid pressure in the line 121.

From the above it will be apparent that the combined or integral anti-stall and valve unit 112 have certain advantages not existing in the embodiment illustrated in FIG. 1. Namely, both valves are mounted on a single axis, which allows for a more compact unit which will take less space in a radial direction within a transmission. Further, a neutral pressure dump means, namely groove 133, is provided to insure that a creep condition will not exist when the manual lever is set in the neutral position. As in the embodiment of FIG. 1, the valve unit 112 provides a simple and efficient means of allowing an operator to control the transmission drive ratio of a hydrostatic transmission, and yet will automatically prevent engine overload or stall regardless of the transmission drive ratio selected.

It will also be apparent that the embodiments of FIG. 1 and FIG. 2 can be used to control the swash plate of a hydraulic motor in a hydrostatic transmission utilizing a fixed displacement pump and a variable displacement motor to change the transmission drive ratio.

It is to be understood that the foregoing description is merely illustrative of preferred embodiments of the invention, and that the scope of the invention is not to be limited thereto but is to be determined by the appended claims.

I claim:

1. In a hydrostatic transmission adapted to be connected to a driving engine including a fluid pump having a variable angle swash plate; a control system comprising a fluid pressure operated means connected to said swash plate; manual means connected to said fluid pressure operated means and movable to actuate said fluid pressure operated means and thereby vary the angle of said swash plate to vary the transmission ratio; a valve connected to said fluid pressure operated means and to said manual means, said valve being responsive to the fluid pressure developed within the transmission and the angle of the swash plate to prevent engine overload through actuation of said fluid pressure operated means so as to maintain constant input torque to the transmission, the responsiveness of said valve being variable and increasing with increasing angular displacement of said swash plate.

2. In a hydrostatic transmission including a fluid pump having a variable angle swash plate, said transmission providing an infinitely variable drive ratio; a control system including a fluid pressure operated servo valve having a piston connected to said swash plate; manual means connected to said servo valve to actuate said servo valve and thereby vary the angle of said swash plate to vary the transmission ratio; valve means connected to said servo valve and to said manual means and operative to actuate said servo valve and prevent engine overload through actuation of said servo valve to change the transmission ratio in response to the output torque of the transmission and the angle of the swash plate so as to maintain a constant input torque to the transmission, said valve being increasingly responsive with increasing displacement of the fluid pump as the angle of the swash plate is increased.

3. In a hydrostatic transmission adapted to be connected to a driving engine including a fluid pump having a variable angle swash plate; a control system comprising a fluid pressure operated servo valve, said servo valve including a piston operatively connected to said swash plate; a pilot valve slidably received in said piston; a manual means operatively connected to said pilot valve, said piston being adapted to follow movement of said pilot valve when said pilot valve is moved by said manual means to thereby change the angle of said swash plate to vary the transmission ratio; a second valve connected to said servo valve and said manual means, said second valve being responsive to the fluid pressure output of said pump and thereby the output torque of the transmission to prevent engine overload by actuation of said servo valve to vary the angle of said swash plate, the responsiveness of said valve being variable and increasing with increased angular displacement of said swash plate.

4. In a hydrostatic transmission adapted to be connected to a driving engine including a fluid pump having a variable angle swash plate; a control system comprising a fluid pressure operated servo valve; said servo valve including a piston operatively connected to said swash plate; a pilot valve slidably received in said piston; manual means operatively connected to said pilot valve, said piston being adapted to follow movement of said pilot valve when said pilot valve is moved by said manual means to thereby change the angle of said swash plate to vary the transmission ratio; a second valve connected to said servo valve and said manual means; said second valve including a piston and a pilot valve slidably received in said piston, said pilot valve for said second valve being connected to the manual means for movement thereby; a fluid communicating connection between said second valve and said servo valve, said valve being responsive to the fluid pressure output of said pump and thereby the output torque of the transmission to prevent engine overload by actuation of said serve valve, the responsiveness of said valve being variable and increasing with movement of said pilot valve for said second valve as said manual means is moved to increase the angular displacement of said swash plate.

5. In a hydrostatic transmission adapted to be connected to a driving engine including a fluid pump having a variable angle swash plate; a control system comprising first and second coaxial valve means, said first valve means comprising a servo valve having a piston connected to said swash plate, said second valve means including a piston movable in response to output pressure from said pump; a fluid passage connected to said first and second valve means; a pilot valve slidable within the pistons for said first and second valve means; a manual means connected to said pilot valve to slidably move said pilot valve with respect to said pistons, said first valve means being constructed to follow movement of said pilot valve by said manual means and thereby change the angle of said swash plate, the piston in said second valve means acting in response to the output pressure of said pump and thereby the output torque of the transmission to supply fluid pressure through said fluid passage to actuate said first valve means to change the angle of said swash plate and prevent engine overload, the responsiveness of said second valve means being variable and increasing with increasing angular displacement of said swash plate.

6. In a hydrostatic transmission adapted to be connected to a driving engine including a fluid pump having a variable angle swash plate; a control system comprising a servo and anti-stall valve unit housed within a common casing, said unit including a servo valve having a piston connected to said swash plate, said valve unit including an anti-stall valve having a piston movable in response to the output pressure of said pump and thereby the output torque of the transmission; a pilot valve slidable within the pistons of said valve unit; a manual means connected to said pilot valve and actuatable to move said pilot valve with respect to said pistons to vary the swash plate angle, said piston for said servo valve being constructed to follow the movement of said pilot valve by said manual means and thereby vary the swash plate angle, said anti-stall valve being connected to actuate said servo valve in response to the output pressure of said pump to prevent engine overload, and the responsiveness of said anti-stall valve being variable and increasing with increased angular displacement of said swash plate.

References Cited by the Examiner
UNITED STATES PATENTS

| | | | |
|---|---|---|---|
| 3,049,884 | 8/62 | Schroeder | 60—53 |
| 3,127,745 | 4/64 | Young | 60—53 |
| 3,152,445 | 10/64 | Weisenbach | 60—53 |

JULIUS E. WEST, *Primary Examiner.*

EDGAR W. GEOGHEGAN, *Examiner.*